United States Patent [19]
Sumiyoshi

[11] Patent Number: 5,231,522
[45] Date of Patent: Jul. 27, 1993

[54] LIQUID CRYSTAL PANEL CAPABLE OF INDICATING BLACK WITHOUT DEPENDENCY OF VISUAL ANGLE

[75] Inventor: Ken Sumiyoshi, Tokyo, Japan
[73] Assignee: NEC Corporation, Tokyo, Japan
[21] Appl. No.: 746,972
[22] Filed: Aug. 19, 1991
[30] Foreign Application Priority Data
Aug. 17, 1990 [JP] Japan .................................. 2-216789
[51] Int. Cl.[5] ............................................. G02F 1/13
[52] U.S. Cl. ........................................ 359/53; 359/73; 359/93
[58] Field of Search .................. 359/53, 73, 93, 94, 359/78

[56] References Cited
U.S. PATENT DOCUMENTS

| | | | |
|---|---|---|---|
| 4,466,702 | 8/1984 | Wiener-Avnear et al. | 359/93 |
| 4,566,758 | 1/1986 | Bos | 359/93 |
| 4,583,825 | 4/1986 | Buzak | 359/93 |
| 4,844,569 | 7/1989 | Wada et al. | 359/93 |
| 4,941,737 | 7/1990 | Kimura | 359/53 |
| 5,090,794 | 2/1992 | Hatano et al. | 359/93 |

*Primary Examiner*—William L. Sikes
*Assistant Examiner*—Huy K. Mai
*Attorney, Agent, or Firm*—Leydig, Voit & Mayer

[57] ABSTRACT

A liquid crystal panel has a first layer of liquid crystal sandwiched between an upper substrate and a lower substrate and oriented in a first direction included within a plane substantially parallel to at least one of the upper substrate and the lower substrate. Liquid crystal molecules of the first liquid crystal in proximity of the upper substrate has a tilt angle in a reversed direction to that of liquid crystal molecules of the first liquid crystal in proximity of the lower substrate. A second layer of parallel-oriented liquid crystal is located in parallel to the first liquid crystal layer and has an orientation direction which is included within a plane of the second layer and is orthogonal to the first direction.

6 Claims, 5 Drawing Sheets

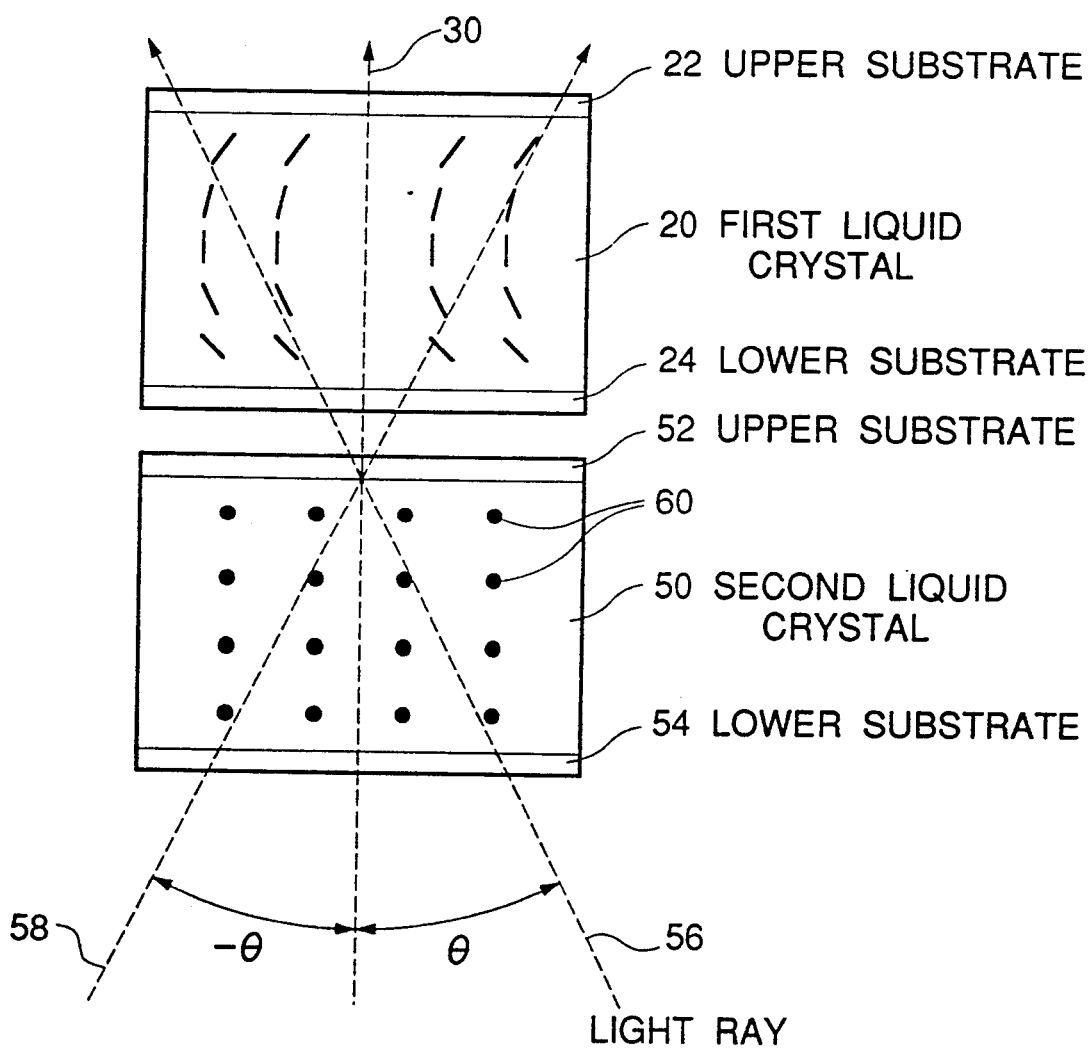

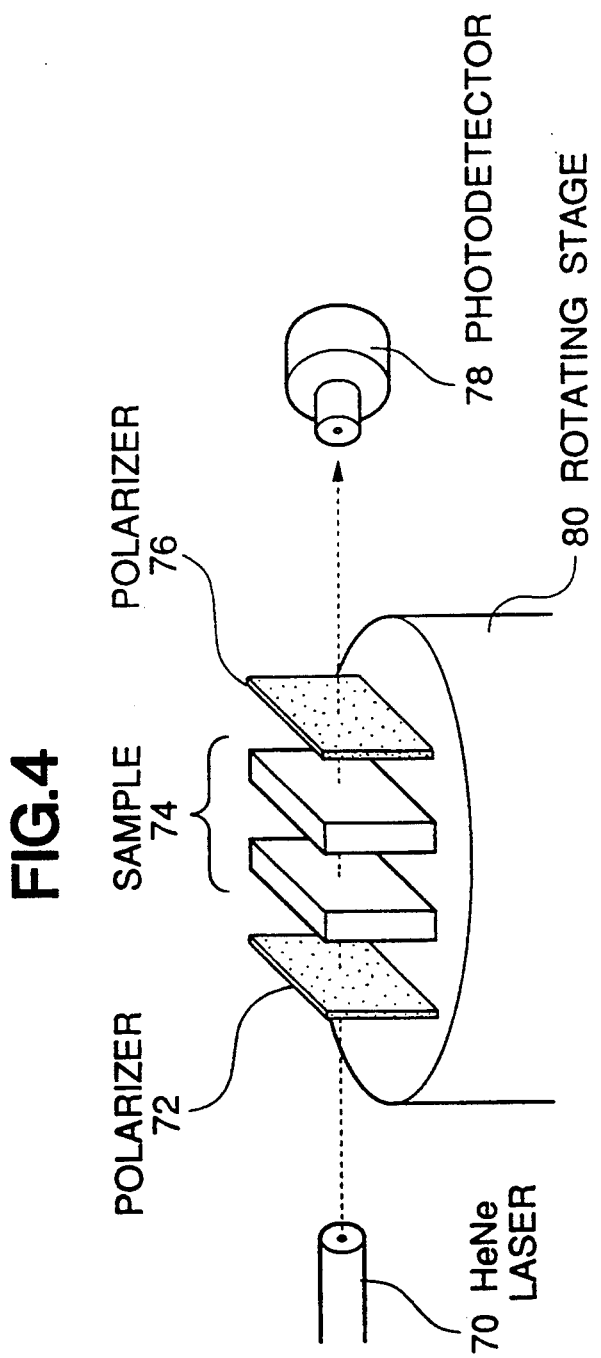

LIQUID CRYSTAL PANEL CAPABLE OF INDICATING BLACK WITHOUT DEPENDENCY OF VISUAL ANGLE

BACKGROUND OF THE INVENTION

1. Field of the Invention

The present invention relates to a liquid crystal panel for use in a display apparatus.

2. Description of Related Art

Liquid crystal display apparatuses have been recently developed in various research institutes. Among the liquid crystal display apparatuses, a liquid crystal display mode called an "electric field controlled birefringence mode" has been known. This mode is characterized in that a liquid crystal is sandwiched between a pair of polarizers having a polarization axis orthogonal to each other, and the amount of birefringence in the liquid crystal is controlled by an applied electric field.

This electric field controlled birefringence mode has dispersion in the amount of transmitted light in connection with the wavelength of light, and therefore, a black indication cannot be obtained. However, a liquid crystal panel has been reported which has succeeded in cancelling the dispersion due to the wavelength so as to enable the black indication, by stacking two parallel-oriented liquid crystal cells so as to have the direction of orientation orthogonal to each other (SAITO and TAKAHASHI, "Non-colored indication by compensated homogeneous-oriented nematic (CHOC) LCD", Transaction of the 37th lecture of the Society of Applied Physics, page 806). If the two liquid crystal cell layers have the same value of Δn, a phase difference caused by one of the two liquid crystal cell layers can be returned to an original condition by the other liquid crystal cell layer. Therefore, the dispersion due to the wavelength can be compensated.

However, the above mentioned liquid crystal cell has large dependency of visual angle. Therefore, if the liquid crystal cell is observed from an inclined direction, it becomes difficult to recognize an image indicated in the liquid crystal cell.

This problem will be explained with reference to FIGS. 1A and 1B. In FIG. 1A, only one liquid crystal cell is shown for simplification of illustration. A homogeneous-oriented liquid crystal cell as shown in FIG. 1A is formed by fixing a pair of parallel-orienting substrates 10 and 12 in parallel to each other and to have a spacing therebetween, and filling a liquid crystal material 14 into the spacing between the pair of parallel-orienting substrates 10 and 12. The amount of birefringence is determined by an angle formed between an incident light ray and a long axis of the liquid crystal molecule. The larger the angle between the incident light ray and the long axis of the liquid crystal molecule becomes, the larger the amount of birefringence becomes, and the smaller the angle between the incident light ray and the long axis of the liquid crystal molecule becomes, the smaller the amount of birefringence becomes. Therefore, as shown in FIG. 1A, an incident light ray 16 in a direction perpendicular to or normal to the parallel-orienting substrates 10 and 12 will have a maximum amount of birefringence, and incident light rays 18A and 18B in a direction inclined to the normal direction of the parallel-orienting substrates 10 and 12 will have a decreased amount of birefringence.

FIG. 1B is a graph illustrating the above mentioned relation between the incident angle of light ray and the amount of birefringence. As seen from FIG. 1B, the homogeneous-oriented liquid crystal cell has the amount of birefringence varying greatly dependently upon a change of visual angle. This problem of dependency of the visual angle will become remarkable particularly in the case of a large-size display screen.

SUMMARY OF THE INVENTION

Accordingly, it is an object of the present invention to provide a liquid crystal panel which has overcome the above mentioned defect of the conventional one.

Another object of the present invention is to provide a liquid crystal panel capable of indicating black without dependency of the visual angle.

The above and other objects of the present invention are achieved in accordance with the present invention by a liquid crystal panel having a first layer of liquid crystal sandwiched between an upper substrate and a lower substrate and oriented in a first direction included within a plane substantially parallel to at least one of the upper substrate and the lower substrate, liquid crystal molecules of the first liquid crystal in proximity of the upper substrate having a tilt angle in a reversed direction to that of liquid crystal molecules of the first liquid crystal in proximity of the lower substrate, and a second layer of parallel-oriented liquid crystal located in parallel to the first liquid crystal layer and having an orientation direction which is included within a plane of the second layer and is orthogonal to the first direction.

The above and other objects, features and advantages of the present invention will be apparent from the following description of preferred embodiments of the invention with reference to the accompanying drawings.

BRIEF DESCRIPTION OF THE DRAWINGS

FIG. 3 is a diagrammatic sectional view of a liquid crystal panel in accordance with the present invention;

FIG. 4 is a diagrammatic view of an instrument for measuring amount of transmitted light in the liquid crystal cell;

DESCRIPTION OF THE PREFERRED EMBODIMENTS

Figure 1A:
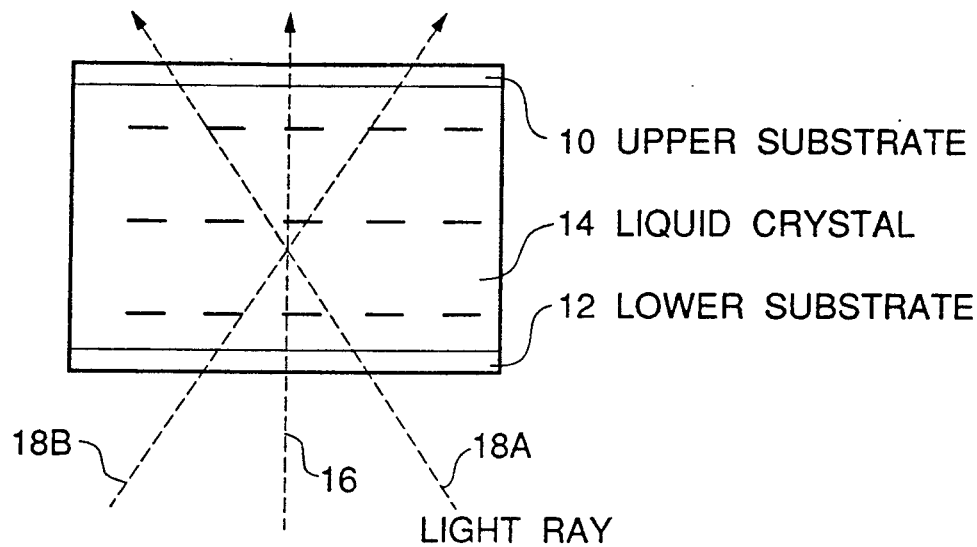
FIG. 1A is a diagrammatic sectional view of a single layer parallel-oriented liquid crystal cell, illustrating a relation between the angle of an incident light ray and a long axis of liquid crystal molecules of the parallel-oriented liquid crystal.
Figure 1B:
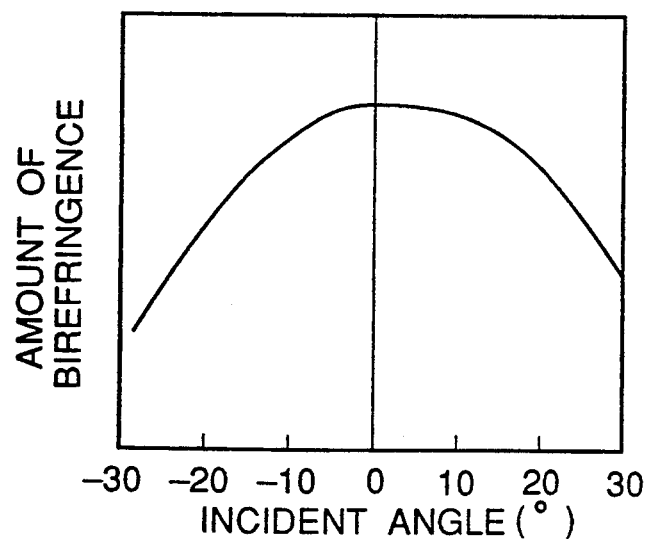
FIG. 1B is a graph illustrating a relation between the incident angle of light ray and the amount of birefringence in the single layer parallel-oriented liquid crystal cell shown in FIG. 1A.
Figure 2A:
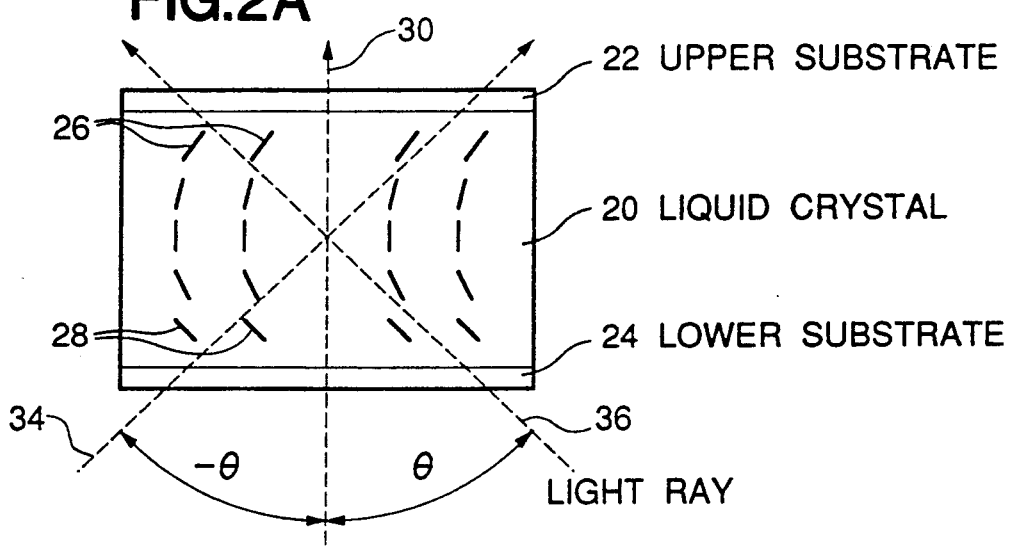
FIG. 2A is a diagrammatic sectional view of a first liquid crystal layer of the liquid crystal panel in accordance with the present invention, illustrating a relation between the angle of an incident light ray and the long axis of the liquid crystal molecules.
Figure 2B:
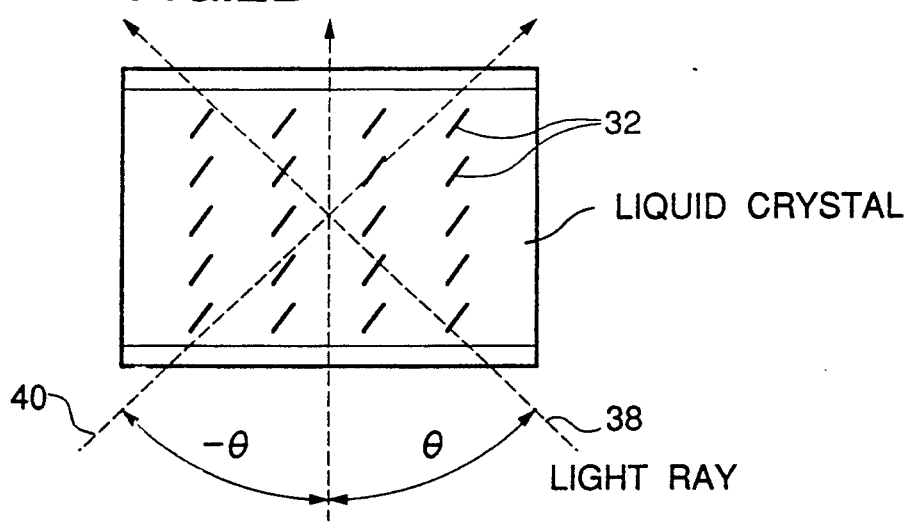
FIG. 2B is a view similar to FIG. 2A, but illustrating a relation between the angle of an incident light ray and the long axis of the liquid crystal molecules in a single direction oriented liquid crystal layer.

Referring to FIG. 2A, there is shown a diagrammatic sectional view of a first liquid crystal layer of the liquid crystal panel in accordance with the present invention. The first liquid crystal layer is designated by Reference Numeral 20, and is sandwiched between an upper substrate 22 and a lower substrate 24. Liquid crystal molecules 26 of the first liquid crystal 20 in proximity of the upper substrate 22 and liquid crystal molecules 28 of the first liquid crystal 20 in proximity of the lower substrate 24 have a pre-tilt angle in a predetermined direction included within a plane in parallel to the upper and lower substrates 22 and 24. Specifically, in FIG. 2A, the liquid crystal molecules 26 in proximity of the upper substrate 22 are inclined leftward to a direction 30 perpendicular to or normal to respective planes of the upper and lower substrates 22 and 24, and the liquid crystal molecules 28 in proximity of with the lower substrate 24 are inclined rightward to the normal direction 30. This orientation structure should be distinguished from a liquid crystal layer in which all liquid crystal molecules 32 are oriented in the same direction, as shown in FIG. 2B. Because, the two orientation structures shown in FIGS. 2A and 2B are different in dependency of the amount of birefringence upon the incident angle of a light ray.

Figure 2C:
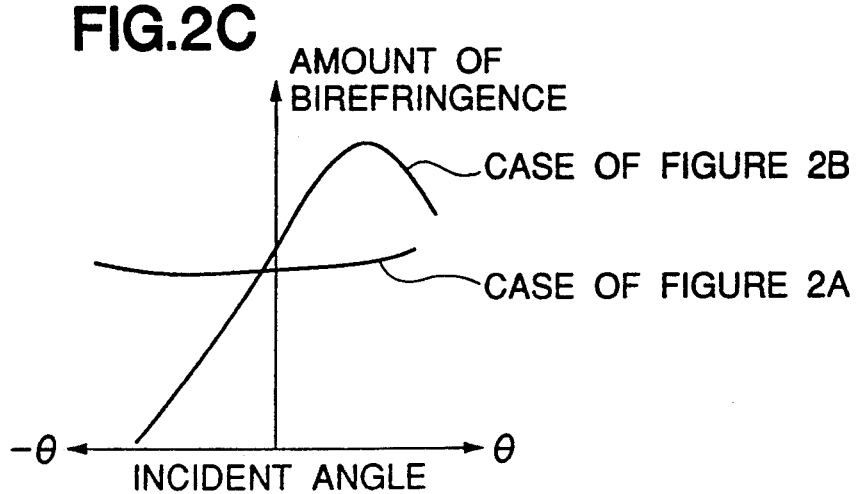
FIG. 2C is a graph illustrating the relation between the amount of birefringence and the incident angle of light ray in the two cases shown in FIGS. 2A and 2B.

Referring to FIG. 2C, there is shown a graph illustrating the relation between the amount of birefringence and the incident angle of light ray in the two cases shown in FIGS. 2A and 2B.

The orientation structure shown in FIGS. 2A has only a slight dependency of the amount of birefringence upon the incident angle of a light ray, and the orientation structure shown in FIGS. 2B has a large dependency of the amount of birefringence upon the incident angle of a light ray.

The reason for this is that: As mentioned hereinbefore, the amount of birefringence depends upon an angle between the direction of an incident light ray and a long axis of liquid crystal molecules. When the angle between the direction of the incident light ray and the long axis of liquid crystal molecules is 90°, the largest birefringence can be obtained. On the other hand, if the direction of the incident light ray is consistent with the long axis of liquid crystal molecules, the amount of birefringence is zero. Therefore, in the orientation structure shown in FIGS. 2A, when an incident light ray is inclined leftward from the normal direction to the substrate as designated by Reference Numeral 34, the light ray 34 is subjected to large birefringence from a liquid crystal portion in proximity of the lower substrate 24, but only a slight amount of birefingence from a liquid crystal portion in proximity of the upper substrate 22. On the other hand, if an incident light ray is inclined rightward from the normal direction to the substrate as designated by Reference Numeral 36, the light ray 36 is subjected to only a slight amount of birefringence from the liquid crystal portion in proximity of the lower substrate 24, but large birefingence from the liquid crystal portion in proximity of the upper substrate 22. Therefore, the total amount of birefringence of the light ray transmitting through the liquid crystal layer 20 does not greatly vary even if the incident angle of the light ray varies.

In the orientation structure shown in FIGS. 2B, on the other hand, if an incident light ray is inclined rightward from the normal direction to the substrate as designated by Reference Numeral 38, the light ray is subjected to an increased amount of birefringence. If an incident light ray is inclined leftward from the normal direction to the substrate as designated by Reference Numeral 40, the light ray is subjected to a decreased amount of birefringence. The reason for this is that an optical axis of the rightward inclined incident light ray 38 is substantially orthogonal to the long axis of the liquid crystal molecules in the liquid crystal cell shown in FIG. 2B, and an optical axis of the leftward inclined incident light ray 40 is substantially in parallel to the long axis of the liquid crystal molecules in the liquid crystal cell shown in FIG. 2B.

As will be apparent from the above, the liquid crystal structure shown in FIG. 2A is characterized in that the liquid crystal portion in proximity of the upper substrate 22 and the liquid crystal portion in proximity of the lower substrate 24 act to compensate the amount of birefringence to each other, so that the light ray transmitting through the liquid crystal layer 20 will be subjected to a substantially constant amount of birefringence regardless of the incident angle of the light ray. However, the liquid crystal structure shown in FIG. 2B does not have the compensation function.

Referring to FIG. 3, there is shown a diagrammatic sectional view of a liquid crystal panel in accordance with the present invention. The shown liquid crystal panel includes a first layer of liquid crystal 20 having the same structure as that of the liquid crystal layer 20 shown in FIG. 2A, and a second layer 50 of parallel-oriented liquid crystal stacked on the first layer 20. The second liquid crystal layer 50 is sandwiched between an upper substrate 52 and a lower substrate 54, and an orientation direction of the second liquid crystal layer 50 is included within a plane in parallel to the upper substrate 52 and the lower substrate 54, and is orthogonal to the orientation direction of the first liquid crystal layer 20 included within a plane in parallel to the upper substrate 22 and the lower substrate 24.

If the amount of birefringence in the first liquid crystal layer 20 is equal to that of the second liquid crystal layer 50 located in parallel to the first liquid crystal layer 20, a black indication can be obtained. If the amount of birefringence in the first liquid crystal layer 20 is different from that of the second liquid crystal layer 50, it is possible to make the amount of birefringence in the first liquid crystal layer 20 equal to that of the second liquid crystal layer 50, by applying an electric voltage to either the first liquid crystal layer 20 or the second liquid crystal layer 50, so that a black indication can be obtained. Therefore, the liquid crystal panel in accordance with the present invention can give a black indication by selecting the applied voltage.

When the incident light ray is inclined from a normal direction 30 to the substrate, as designated by Reference Numerals 56 and 58, the first liquid crystal layer 20 exerts the compensation function as mentioned hereinbefore, and on the other hand, the amount of birefringence in the second liquid crystal layer 50 does not vary dependently upon the change of the incident angle of the light ray as shown in FIG. 3. The reason for this is that, even if the incident angle of the light ray changes as shown in FIG. 3, the angle between the direction of the incident light ray and the long axis of liquid crystal molecules 60 in the second liquid crystal layer 50 does not change.

Thus, the liquid crystal panel in accordance with the present invention can indicate black with less dependency of visual angle Here, it should be understood that even if either the first liquid crystal layer or the second liquid crystal layer is replaced with an optical compensation plate having the same function, a similar effect can be obtained.

EXAMPLE

One example of the liquid crystal panel in accordance with the present invention was actually manufactured.

A plurality of glass substrates were washed with a surface-active agent, and then, divided into two groups. A first group of glass substrates were spin-coated with polyimide, and baked at 200° C. Thereafter, a rubbing was performed. On the other hand, a second group of glass substrates were spin-coated with polyimide mixed with 2% of chromium complex solution (available under the trade name "Sebran CRN" from Ippoya Yushi of Japan), and then, were baked at 200° C. Thereafter, a rubbing was performed.

A pair of glass substrates of the first group were coupled by a bonding agent to each other, with glass balls of 5 μm diameter being interposed between the pair of glass substrates so as to leave a spacing of 5 μm thickness between the pair of glass substrates, and with the rubbing directions of the pair of glass substrates being in parallel to each other but opposite to each other. On the other hand, a pair of glass substrates of the second group were coupled by a bonding agent to each other, with glass balls of 5 μm diameter being interposed between the pair of glass substrates so as to leave a spacing of 5 μm thickness between the pair of glass substrates, and with the rubbing directions of the pair of glass substrates being in parallel to each other and the same as each other.

The two sets of parallel-stacked glass substrates were located in a vacuum chamber, and the vacuum chamber was drawn to a vacuum. After the vacuum drawing, a nematic liquid crystal material of $\Delta n = 0.1$ was injected into the spacing between the parallel-stacked glass substrates through an injection hole. Then, the two sets of liquid crystal material injected parallel-stacked glass substrates were taken out of the vacuum chamber, and the injection hole of each set of liquid crystal material injected parallel-stacked glass substrates was sealed with a bonding agent.

Referring to FIG. 4, a system for measuring the liquid crystal panel in accordance with the present invention is illustrated.

A laser light emitted from an HeNe laser 70 is caused to pass through a polarizer 72, so that a linear polarized laser light is injected to a sample 74. The light having transmitted through the sample 74 is caused to pass through another polarizer 76 having a polarizing axis orthogonal to that of the polarizer 72, and then, the linear polarized light outputted from the polarizer 76 is detected by a silicon photodetector 78. The polarizer 72, the sample 74 and the polarizer 76 are located on a rotating stage 80. Therefore, by rotating the rotating stage 80, the incident angle of the light ray is changed, and a signal outputted from the photodetector 78 is recorded.

Figure 5A:
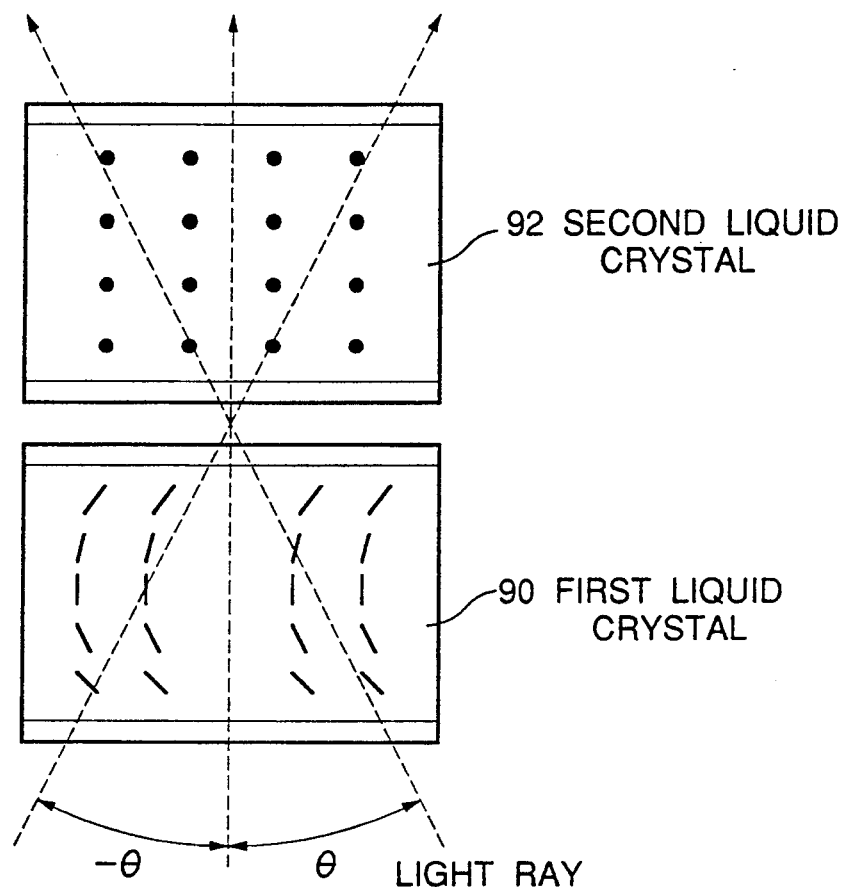
FIG. 5A is a diagrammatic sectional view of an embodiment of the liquid crystal panel in accordance with the present invention.
Figure 5B:
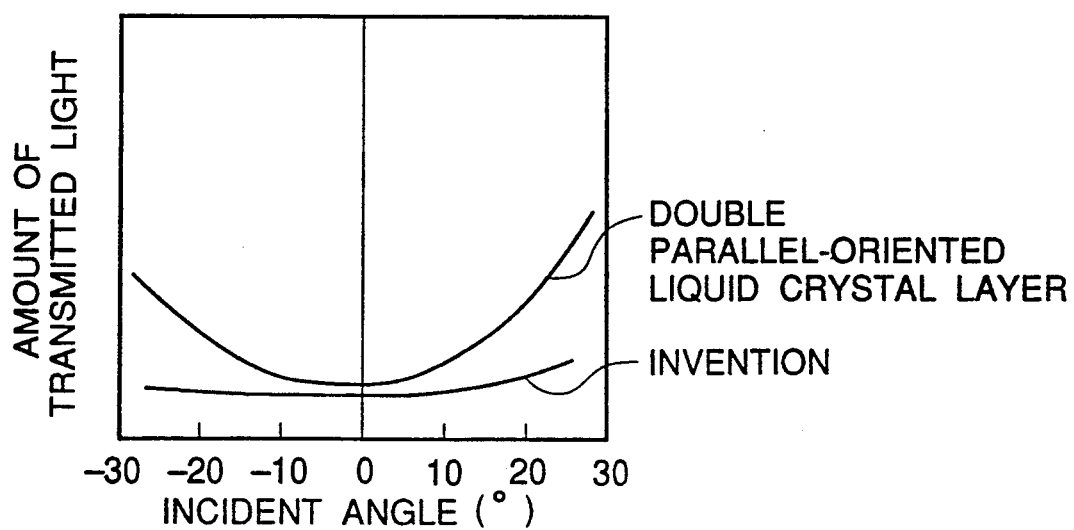
FIG. 5B is a graph illustrating the relation between the amount of transmitted light and the incident angle of light ray in the liquid crystal panel in accordance with the present invention and in a conventional double layered parallel-oriented liquid crystal panel.

Now, a result of measurement of the liquid crystal panel in accordance with the present invention will be explained with reference to FIGS. 5A and 5B. A first liquid crystal layer 90 was formed of the liquid crystal sandwiched between the pair of first group glass plates having the rubbing directions in parallel to each other but opposite to each other. A second liquid crystal layer 92 was formed of the liquid crystal sandwiched between the pair of second group glass plates having the rubbing directions which are in parallel to each other and the same as each other. The first and second liquid crystal layers 90 and 92 are located to have the rubbing directions orthogonal to each other.

The liquid crystal panel thus formed was located as the sample 74 of the measuring instrument shown in FIG. 4, and the signal outputted from the photodetector 78 was recorded while changing the incident angle of the light ray. The result of the measurement is shown in the graph of FIG. 5B. For comparison, a result of measurement of two parallel-oriented liquid crystal layers stacked to have their rubbing directions orthogonal to each other is also shown in FIG. 5B. It will be understood that the liquid crystal panel formed in accordance with the present invention has remarkably improved the dependency of the visual angle.

The invention has thus been shown and described with reference to the specific embodiments. However, it should be noted that the present invention is in no way limited to the details of the illustrated structures but changes and modifications may be made within the scope of the appended claims.

I claim:

1. A liquid crystal panel having a first layer of liquid crystal sandwich between an upper substrate and a lower substrate and including liquid crystal molecules oriented in the same direction within a plane substantially parallel to at least one of the upper substrate and the lower substrate, the liquid crystal molecules of the first layer of liquid crystal in proximity of the upper substrate having a tilt angle in a reversed direction to that of the liquid crystal molecules of the first layer of liquid crystal in proximity of the lower substrate, and a second layer of liquid crystal located in parallel to the first layer of liquid crystal and including parallel oriented liquid crystal molecules having an orientation direction which is orthogonal to the direction of orientation of the liquid crystal molecules of the first layer of liquid crystal.

2. A liquid crystal panel claimed in claim 1 wherein each of the upper and lower substrates of the first liquid crystal layer has a rubbed surface in contact with the first layer of liquid crystal, and a rubbing direction of the upper substrate is in parallel to but opposite to a rubbing direction of the lower substrate.

3. A liquid crystal panel in claim 1 wherein each of the upper and lower substrates of the first liquid crystal layer is formed of a glass plate coated with polyimide, and a polyimide coating of each of the upper and lower substrates has a rubbed surface in contact with the first layer of liquid crystal, a rubbing direction of the upper substrate is in parallel to but opposite to a rubbing direction of the lower substrate.

4. A liquid crystal panel claimed in claim 2 wherein the second liquid crystal layer is sandwiched between a pair of substrates having a rubbed surface in contact with the second layer of liquid crystal, and a rubbing direction of the pair of substrates is in parallel to each other and the same as each other, and the rubbing direction of the pair of substrates of the second liquid crystal layer being orthogonal to the rubbing direction of the first and second substrates of the first liquid crystal layer.

5. A liquid crystal panel comprising:
   an upper substrate;
   a lower substrate;
   a first layer of liquid crystal sandwiched between the upper substrate and the lower substrate including liquid crystal molecules oriented in the same direction within a plane substantially parallel to at least one of the upper substrate and the lower substrate, the liquid crystal molecules of the first layer of liquid crystal in proximity of the upper substrate having a tilt angle in a reversed direction to that of the liquid crystal molecules of the first layer of liquid crystal in proximity of the lower substrate; and
   a second layer of liquid crystal, located in parallel to the first layer of liquid crystal, including parallel oriented liquid crystal molecules having an orientation direction which is orthogonal to the direction of orientation of the liquid crystal molecules of the first liquid crystal layer, and wherein a voltage applied to either the first or second layer of liquid crystal equalizes the amount of birefringence between the first and second layer of liquid crystal and obtains a black display without dependency on a visual angle.

6. A liquid crystal panel as recited in claim 5 wherein the voltage is applied to the second layer of liquid crystal.

* * * * *